July 8, 1969   D. L. HOCHBERG   3,454,765
THERMOGRAPHIC REPRODUCTION PROCESS USING STENCIL LAMINATE
MATERIAL WITH A LAYER OF PRESSURE SPREADABLE
AND INFRARED REFLECTIVE MATERIAL
Filed Oct. 23, 1965

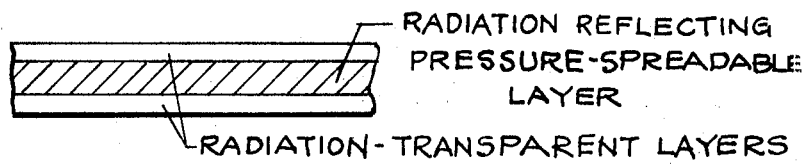

Fig. 1 — RADIATION REFLECTING PRESSURE-SPREADABLE LAYER; RADIATION-TRANSPARENT LAYERS

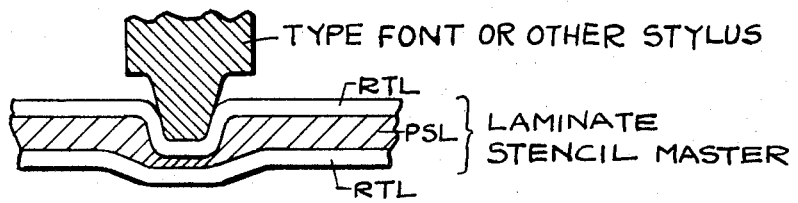

Fig. 2 — TYPE FONT OR OTHER STYLUS; RTL, PSL, RTL; LAMINATE STENCIL MASTER

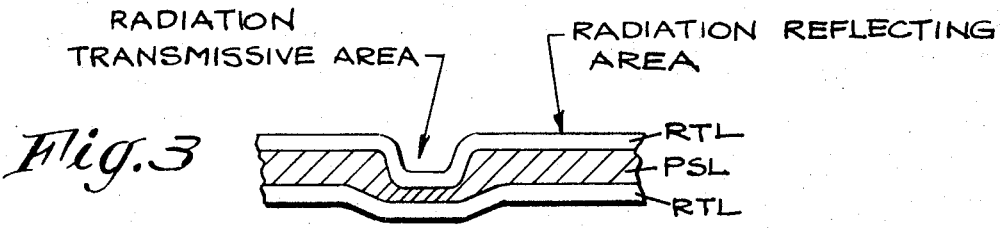

Fig. 3 — RADIATION TRANSMISSIVE AREA; RADIATION REFLECTING AREA; RTL, PSL, RTL

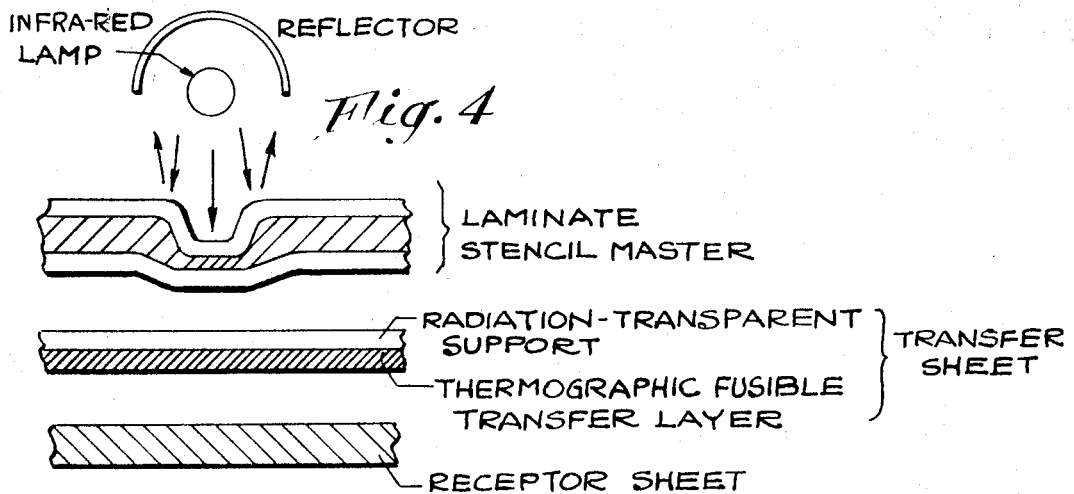

Fig. 4 — INFRA-RED LAMP; REFLECTOR; LAMINATE STENCIL MASTER; RADIATION-TRANSPARENT SUPPORT; THERMOGRAPHIC FUSIBLE TRANSFER LAYER; TRANSFER SHEET; RECEPTOR SHEET

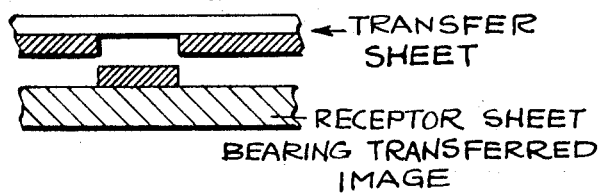

Fig. 5 — TRANSFER SHEET; RECEPTOR SHEET BEARING TRANSFERRED IMAGE

INVENTOR.
David Louis Hochberg
BY Charles J. Nickey
ATTORNEY 3,454,765
THERMOGRAPHIC REPRODUCTION PROCESS
USING STENCIL LAMINATE MATERIAL
WITH A LAYER OF PRESSURE SPREADABLE
AND INFRARED REFLECTIVE MATERIAL
David Louis Hochberg, New York, N.Y., assignor to
Pitney-Bowes, Inc., Stamford, Conn., a corporation
of Delaware
Filed Oct. 23, 1965, Ser. No. 503,330
Int. Cl. G01n 21/34

ABSTRACT OF THE DISCLOSURE

A method of thermographic copying is disclosed in which a stencil laminate, having a layer of infrared radiation reflective pressure spreadable material sandwiched between plastic sheets, is subjected to pressure as by typing or stylus printing to render the laminate transparent to the radiation in selected areas, after which the stencil is interposed between a source of radiation and a fusible thermographic material which is adjacent a receptor sheet to thereby transfer such material to the receptor sheet according to the pattern of the selected transparent areas of the stencil.

---

This invention relates to a stencil laminate material. The invention more specifically releates to a laminate having special radiation-transmitting, reflecting, and scattering characteristics wherein these characteristics may be altered over the area of the laminate by local application of contact pressure.

It is known from U.S. Patent 2,552,233 to Tate to produce a laminate which may be made into a stencil by pressure such as typing for use with visible or ultra-violet light. Tate teaches use of dyes or transparent pigments which absorb the light. Such a stencil is not suitable for thermographic imaging where infrared radiation is used since the stencil pigment or color passes the infrared. Moreover, the use of materials absorptive to infrared would not be suitable due to heat build up in the stencil and consequent destruction thereof.

The laminate of the invention consists generally of a layer of pressure-spreadable material between two outer layers of relatively flexible sheet material.

The pressure-spreadable material is reflective and/or scatters infrared radiation, that is radiation as high or higher than 7,000 angstroms, up to 30,000 angstroms and usually comprises a mixture of a pressure-spreadable base containing a pigment which reflects or scatters the radiation. The base providing the spreadable properties is usually a wax-like material, such as a natural or a synthetic wax or mixtures thereof. Other materials can be added to the wax to influence its characteristics in response to pressure and to radiation, such as natural or synthetic oils, surface active agents, petrolatum, thixotropic agents, and the like. The type of waxy material can be widely variable since its physical properties are the main consideration. The waxy base must be such that it maintains a set position under infrared radiation, but is movable or spreadable under application of local pressure such as from a stylus or other line-producing means such as a typewriter key font, and the like.

The pigmented spreadable material is reflective and/or scattering but may have some absorption. The main factor is that it is substantially nontransmissive of the radiation.

The outer sheets of the laminate of the invention may be either the same material or different materials. The requirements for the outer sheet material is that it is transmissive of the radiation and is sufficiently flexible to permit movement of the intermediate spreadable layer by application of local pressure to the outer layer.

Such materials as cellulose acetate, polyethylene terephthalate, and the like, are suitable outer sheet materials. One of the outer layers of a laminate may be more rigid than the other as long as the other outer layer is sufficiently flexible to transmit the required pressure to the intermediate spreadable layer.

The thicknesses of the outer and inner layers of the laminate may vary. It has been found that a satisfactory laminate is generally made where the layers are each about 1 mil thick, however under some conditions thickness of the pressure-spreadable layer of the order of several mils has been satisfactory.

The laminate is especially useful as a stencil material for reproduction of images by infrared radiation. Application of pressure such as by writing or typing, spreads the intermediate layer in the areas where pressure is applied. The spreadable material maintains the new position, thus leaving areas where the intermediate layer is almost absent or at any rate is thinner between the outer layers. Thus, these areas will transmit radiation to a greater degree than the background whereas the remainder of the laminate areas reflects or otherwise reduces transmitted radiation to a greater degree, giving a stencil for reproduction of an image. The reflective pigments reflect the infrared rays, thus preventing heat destruction of the stencil and contributing to increased stencil life. The stencil may be handled without disturbing the image. However, it is also possible to change (or correct) errors in the prepared stencil with a blunt or rounded object which moves the spreadable material back into the vacated areas. The correction may then be made by reapplication of pressure in the correct pressure outline.

It is an object of my invention to provide a laminate having infrared radiation-transmission characteristics which may be altered by the application of pressure.

A further object is to provide a stencil material for preparation of image areas by application of pressure.

Another object is to provide a stencil material in which impressed information is readily visible.

A further object is to provide a stencil material for infrared radiation reproduction.

Another object is to provide a decoratively colored stencil material for radiation reproduction.

Another object is to provide a stencil which is readily correctable.

Another object is to provide a self-protecting stencil which does not require a receptor paper or a throw-away material.

An additional object is to provide a stencil which reproduces faithful outlines of the pressure-applying instrument or image in the pressure-spreadable material.

These and other objects of my invention will become apparent as the description thereof proceeds.

The invention will be more readily understood by reference to the drawings in which:

FIG. 1 is a cross-section of a laminate with like outer layers.

FIG. 2 is a cross-section of the laminate of FIG. 1 showing pressure-spreading of the intermediate layer.

FIG. 3 is a cross-section of the laminate of FIG. 2 after pressure-spreading of the intermediate layer.

FIG. 4 shows a laminate stencil master used for carbon transfer printing with imaging by infrared radiation.

FIG. 5 is a cross-section showing the image obtained from FIG. 4.

Several methods have been employed in the preparation of laminates described in this application. The laminates all performed satisfactorily in the operations involving their use. They were prepared for use in two general ways. The first way consisted of making the laminate and then applying the information to it (such as by typing or writing upon it with a moderate pressure using an instrument which did not leave a mark other than the pressure-spreading image in the laminate). The second way consisted of preparing the laminate after the information had been applied to the pressure sensitive sheet either as above, by pressure-induced spreading, or by pressure-induced transfer of the coating material to a throw-away receptor sheet.

Methods of preparing the laminate before applying information to it consisted of:

*Method 1.*—Coating the transparent support with pressure-spreadable material and then applying another transparent support layer to the coating side of the coated product with simultaneous application of heat and pressure.

*Method 2.*—Joining two separate portions of the coated product to one another by placing the coated side of each in contact with the coated side of the other with simultaneous application of heat and pressure.

*Method 3.*—Applying the molten pressure-spreadable material to the nip between two webs of the transparent support passing through a gap of fixed width.

*Method 4.*—Applying a thin, delicate, weakly-adherent coating of the reflective pigment to one support layer and applying the nonpigmented pressure-spreadable material to the other support layer and then placing the two coated layers in contact with one another while simultaneously applying heat and pressure.

*Method 5.*—Applying the pressure-spreadable nonpigmented material to one support in a coating operation and then applying a thin, delicate, weakly adherent coating of the reflective pigment to the pressure-spreadable material on the transparent support followed by application of a second radiation-transparent support to the pigmented layer under the application of heat and pressure.

In various cases in which the laminates prepared by the above Methods 1 to 5 were intentionally separated by peeling the transparent support materials in opposite directions from one another, the way in which the peeling occurred indicated that sometimes a loosely-adherent layered structure characterized the prepared laminate while in other cases the layered structure did not show clear cut lines of separation at individual layer boundaries indicating that some layer-material intermingling had occurred during laminate preparation.

Methods of preparing the laminate after information had been applied to the coated product while in contact with a receptor sheet which could later be separated from the coated product after information was transferred from the coated product to the receptor sheet consisted of:

*Method 1.*—Applying a transparent support coated with a pressure-sensitive adhesive to the coated side of the pressure-sensitive (pressure-spreadable or transferable) sheet.

*Method 2.*—Applying a transparent support to the coated side of the pressure-sensitive sheet with the simultaneous application of heat and pressure.

*Method 3.*—Applying a transparent support to the coated side of the pressure sensitive sheet, said transparent support being essentially nonadhesive to the coating on the pressure-sensitive sheet but nevertheless held against it by some other method, for example, by mechanical attachment at its extremities.

Regardless of the method of preparing the laminate material it should be noted that the following are among the requirements of the materials employed in its preparation:

(A) The material between the support layers:

(1) Must be pressure-spreadable or pressure-transferable.

(2) Must be inert chemically with regard to each of the support layers.

(3) Must be capable of reducing the transmission of infrared radiation (that is radiation from about 7,000 to 30,000 angstroms) through the support materials whether by reflection and/or scattering, or the like or by a combination of these methods.

(4) Must be stable to decomposition or aging or other reaction which might unfavorably alter any of the above properties either occurring spontaneously or induced by infrared radiation employed in exposure.

(5) Must possess the desired degree of adhesion to the support.

(B) The support layers:

(1) Must be either the same or different, chemically speaking, in a given laminate.

(2) Must possess a relatively high degree of transparency to the infrared radiation employed.

(3) Must be chemically inert in contact with the material between them.

(4) Must not be altered in a detrimental way by the infrared radiation employed.

(5) May be of the same or different thickness on opposite sides of the pressure-sensitive layer.

(6) Must be durable under the condition of use.

(7) Must possess the required degree of adhesion so as to facilitate bonding to the pressure-sensitive material.

Certain general statements about the nature and concentration ranges of the ingredients employed in the preparation of the laminate stencils of this invention can be made.

The pigments employed should have refractive indices considerably different from the refractive index of the material in which they are suspended. This will produce a maximum of radiation scattering and reflection in the non-image areas of the stencil. While pigments have been observed to work well, but color is not important so long as it does not lead to radiation absorption and conversion to heat which can cause flow and eradication of images impressed into the laminate.

For optimal scattering properties, the pigment particle diameter should be smaller than the wavelength of the radiation employed. Titanium dioxide pigment has been found to work well for thermographic printing with infrared radiation through stencils containing it. Particle size of the $TiO_2$ pigment is less than 0.4 micron. Other pigments may be used. Some pigments used, for example, are Aluminum Powder #422 (Alcoa), $TiO_2$ (Du Pont), Thermoguard H-Antimony Oxide (Metal and Thermit), AZO-ZZZ-88 Zinc oxide (American Zinc Sales Co.), Aluminum Powder #123 (Alcoa), Lead carbonate (Fisher), $TiO_2$ (Du Pont) 8020-50-1 Ti-Pure-610, (Du Pont) 8020-50-3 large particle size 8020-50-4 experimental fibrous material (Cabot) RF-1 $TiO_2$, Titanox RANC (Titanium Pigment Corp.) (Du Pont) 8020-50-5 Gold Afflair Flake Pigment $BaCO_3$, $TiO_2$ Unitane 0-110 Cyanamid, and National Lead High IR-Reflecting rutile MF-2117.

With regard to waxy material employed in pressure-spreadable formulations it should be pointed out that in the absence of oily ingredients the waxy material should preferably be soft. This often means that the waxy material has a low melting point (or melting range), and necessitates a high pigment-loading in the formulation to maximize reflectance and minimize temperature rise during exposure.

In oil-containing formulations, it has been observed that the melting point or melting range of the waxy material is not quite as important with regard to ability to withstand overexposure as one might expect. In such formulations, the waxy material and oil are usually present as separate and distinct phases, finely divided and intermixed with one another. In these formulations, the effect of increased temperature on the solubility of the oil and waxy material in one another and also the change in viscosity of the mixture with increasing temperature probably play an important role in the durability of a stencil laminate exposed to infrared radiation. Such waxy materials may be used as Polyethylene #6 (Allied Chemical), Acrawax C (Glyco Chemical), Carnauba wax, Paraffin wax (Esso), Spermaceti wax U.S.P. melting range 12-50° C. (Fisher), Beeswax U.S.P. (Fisher), stearic acid (Fisher), Kenstrene Amide B-Behenamide (Humko) and glyceryl monostearate (Fisher).

The oily ingredient is advantageously added when a hard waxy material is used in the laminate formulation. Its function is to reduce hardness or brittleness and to improve flowability and can do so either by forming a separate phase distinct from the waxy material or by forming a solution with the waxy material, depending on the mutual solubilities at ambient and elevated temperatures. The conditions of dispersion or solution of the waxy and oily materials should be unaffected by temperatures normally encountered in preparing, exposing, and storing the stencil laminate, lest its properties possibly change during the lifetime of the laminate to produce an undesirable product. Suitable oily materials are, for example, mineral oil, tricresyl phosphate, Dow Corning Fluid 200-100 cp., Dow Corning Fluid 555-20 cp., and Castung 103 GH (Baker Castor Oil Co.).

The radiation absorption spectra of laminate ingredients other than pigment should necessarily be such that they do not absorb energy appreciably, since this could lead to destruction of the laminate image or even be detrimental to its mechanical properties. While narrow wavelength band absorption (such as structural bands in the near infrared region) can be tolerated, broad band absorption cannot be tolerated. Destruction of the laminate will occur if it receives too large an "exposure" (defined as the product of energy absorbed and time of exposure). The quantity of energy absorbed by the stencil is determined by the absorption spectrum of each ingredient exposed to radiation and the intensity of the source. In the case of exposure through a glass plate wavelengths longer than 3 microns are, to a large extent, filtered from the source before reaching the stencil laminate. Materials exhibiting broad exposure at wavelengths greater than 3 microns could safely be included in stencil laminates exposed through a glass plate.

Pigment dispersion may be aided by the addition of a suitable surface active agent, e.g., Igepal CA-630, to the formulation. The use of a heated ball mill or of a heated roll mill or other heated high shear equipment also improves pigment dispersion.

Use of a thixotropic material in the pressure-spreadable layer improves the resistance of the laminate to the effects of high temperatures which might be generated within it during exposure. The viscosity of the pressure-spreadable material is increased by incorporation of the thickener except under the condition when the pressure-spreadable material is subjected to a high rate of shear, such as during the creation of the deformation in the stencil laminate by a rapidly moving instrument such as a typewriter key. Higher viscosity, in the absence of shear, reduces flow due to temperature elevation, giving a more stable stencil laminate product. Suitable thixotropic agents include, for example, Thixatrol ST.

It has also been found helpful to add petrolatum to some formulations as a means of improving response of the pressure-spreadable material to pressure.

The infrared radiation-transparent supports should possess sufficient mechanical strength to enable their use in such devices as a typewriter without perforation of either of the support layers. The prepared stencil is suitable for use in printing at low pressure. The Ditto Masterfax exposure device employed in the examples which follow incorporates a vacuum blanket in the exposure station. Hence, its operating pressure is of the order of one atmosphere.

The concentration of the various ingredients in the pressure-spreadable mixtures depends in part on the materials used. Generally, the harder the waxy material, the higher the pressure required to prepare the stencil unless an oily material is added. The amount of oil added depends not only upon the hardness of the wax but also upon whether the oily material acts as either an internal or external plasticizer for the wax. The pigment's oil-absorption ability also determines the required oil concentration, a porous pigment requiring more oil than a non-porous one. The quantity of wetting agent and/or thixotropy additive, if needed, is determined by the nature and quantity of the other ingredients. Increased opacity to radiation is obtained by increasing pigment concentration. The increase of pigment concentration generally causes loss of pressure-spreadability.

The concentrations of the various ingredients to use in a formulation are best determined by experimentation. This may be helped somewhat if a particular desired exposure speed is first decided upon for stencils prepared under a prescribed print pressure. Stencil laminate materials having a wide range of optimum exposure speeds (as well as a variety of exposure latitudes) may be prepared. Use of a high-melting waxy material and an oil with a flat temperature-viscosity relationship yield the laminate with the better stability to exposure at fixed pigment concentration.

The ingredients for the pressure-spreadable layer may be used in the following amounts based on 100% as the total amount:

The wax may constitute from 20 to 99%, preferably 40 to 90%; the pigment may range from 1 to 80%, preferably 10 to 60%; oil is from 0 to 50%, preferably 5 to 30%; petrolatum is from 0 to 50%, preferably 5 to 30%; thixotropic agent is from 0 to 20%, preferably 2 to 10%; the surface active agent is from 0 to 10%, preferably 0 to 5%; and coloring matter, when used, is from 0.01 to 30%, preferably 0.1 to 5%.

Suitable film or sheet materials are, for example, polyethylene terephthalate (Mylar), polyethylene, polypropylene, polyvinylidene chloride, cellulose acetate, acrylics, polystyrene, cellulose acetate-butyrate, cellulose nitrate, and polyvinyl butyral.

Suitable nonthermographic coloring matter, such as a soluble dye, may be added to the pressure-spreadable formulation for decorative reasons. The added coloring matter should preferably have a high degree of transparency to the utilized infrared radiation used to achieve thermographic printing in order to prevent image washout during exposure to the radiation caused by flow or the pressure-spreadable layer induced by the absorption of heat by it. Similarly, the coloring matter may be either added to or coated upon either one or both of the radiation-transparent sheets which make up the outer surfaces of the laminate. If desired, the radiation-transparent coloring matter may be applied in the form of printed information or other decoration without adversely affecting the operation of the laminate material with respect to its end use as a stencil for printing. An additional feature of the use of coloring matter is that it permits color coding of stencils which may be easily recognizable by visual means or otherwise.

The following examples are set forth to enable persons skilled in the art to better understand and practice the invention and are not intended to be limitative. Laminating and exposure speeds cited in these examples pertain to the particular device and operating conditions (such as line voltage, ambient temperature, fusion temperature of transfer carbon, and so forth) and are presented solely to give an indication of their order of magnitude.

EXAMPLE I

The purpose of this example is to illustrate the preparation of a pressure-spreadable laminate containing a minimal number of ingredients. It also illustrates a method of reducing the smearing tendency of a waxy carbonaceous image.

A pressure-spreadable radiation-scattering reflective laminate was prepared in the following way.

50.0 g. of U.S.P. Spermaceti Wax (melting range 42–50° C., Fisher Scientific Co., lot #74226) was melted and heated to about 220° F. Then, 42.0 g. of Du Pont "Ti-Pure R–901," lot #3397, rutile ($TiO_2$) pigment was added to the melt with rapid (high shear rate) stirring. A #6 wire wound rod (R.D. Specialties, Webster, N.Y.) was heated to about 300° F. and was held above and in contact with a web of Du Pont 1 mil 100 C. clear transparent "Mylar" polyethylene terephthalate film moving at a linear speed of about 20 ft./min. The smooth dispersion of pigment in wax was poured onto the moving web just upstream from the rod.

A laminate was prepared from portions of this coating by placing the coated surfaces of two separate pieces of material in contact with each other, but perpendicular to each other with regard to direction of coating, squeezing out air from between them by gentle fingertip pressure, and then placing them on a black thermographic (infrared radiation-absorbing) sheet of paper which was placed on the glass surface of a speed-modified Ditto Masterfax machine (described in U.S. 3,119,318). Application of the required heat and pressure to prepare the laminate was accomplished by running the Masterfax machine at approximately 2.4 inches/sec. In this way a laminate of about 3.0 mils total thickness was prepared, the Mylar faces of which were approximately 1.0 mil each in thickness.

The laminate was typed upon at a pressure of 5 using the stencil setting of an IBM Standard Electric typewriter, Model B, Code 02 (any pressure from 0 to 10 was also satisfactory in preparing laminate stencils). A sharp impression of the typewriter characters (12 characters per inch, type mark E) was obtained on the laminate. The keys did not penetrate either of the Mylar surfaces. The impressed (or image) areas were readily seen to be more transparent to visible light than background (or nonimage) areas. The laminate was placed upon the glass plate of the Masterfax machine. A piece of Columbia Marathon 5–40 pressure-transfer carbon paper (Columbia Ribbon & Carbon Manufacturing Co., Inc.) was placed with its paper support side against a piece of 1 mil clear Mylar which, in turn, was placed upon the laminate bearing the typed image. A piece of ordinary white pad paper was placed upon the carbon-coated side of the carbon paper and the pile of sheets was exposed in the Masterfax machine at a speed of about 4.8 inches per second. Several exposures were made (using fresh carbon paper for each exposure), each of which produced a print of the laminate image in black letters on the white pad paper. An overall exposure of the pad paper bearing the transferred black characters at a speed of about 1.9 inches per second "burned" the characters into the copy paper and considerably reduced their smearing tendency when subjected to rubbing with a fingertip to intentionally induce smearing. This second exposure allowed time for the transferred wax to flow into the pad paper and "fix" the image.

The piece of 1 mil Mylar placed between the laminate and the carbon paper was used to prevent transfer to the laminate of a colorless waxy back-coating on the typewriter carbon paper intended to serve as an anticurl layer.

EXAMPLE II

The purpose of this example is to illustrate the interchangeability of waxy materials employed in making pressure-spreadable laminates.

A pressure-spreadable laminate was made as in Example I. U.S.P. white Beeswax (Fisher Scientific Co. lot #745448) was substituted for the Spermaceti wax used in Example I. The coating was applied at 70° C. Laminating exposure was done at approximately 2.2 inches per second. The laminate total thickness was 4.7 mils and copies were prepared at a speed of about 3.0 inches per second. Images were produced as in Example I.

Both Spermaceti wax and Beeswax are soft waxes with relatively low melting points. In the following examples, the use of harder, higher melting point waxes is illustrated, along with the use of certain additives. Use of a harder wax such as Carnauba wax as a substitution for Spermaceti wax or for Beeswax in Examples I or II requires additives, such as mineral oil and petrolatum, to obtain formation of preferred thin, flexible coatings.

EXAMPLE III

This example illustrates an improvement in both coatability and pressure-spreadability induced by introduction of an oily material into pigmented formulations as described in the previous Examples I and II.

A considerable improvement in coatability results when mineral oil is added to pigmented Carnauba wax in preparing a pressure-spreadable material for use in a laminate. The following formulation was stirred at high speed and high shear rate at about 200–210° F.:

|  | Grams |
|---|---|
| Carnauba wax | 30.0 |
| Mineral oil (Nujol, extra heavy mineral oil, Plough, Inc.) | 45.0 |
| Du Pont "Ti-Pure R–901" $TiO_2$ | 75.0 |

When coated as above and then laminated between 1 mil Mylar sheets, a total thickness of 3.1 mils was obtained for the laminate. Laminating speed was about 1.2 inches per second. Several printing exposures were made as described in Example I at about 4.4 inches per second through the laminate to produce sharp black images on white pad paper.

EXAMPLE IV

This example illustrates the inclusion of petrolatum in a pressure-spreadable formulation as an ingredient which, like mineral oil, improves the coating application and consistency.

The following mixture was stirred rapidly at 200–210° F. and coated onto 1 mil Mylar at about 20 ft./min.

|  | Grams |
|---|---|
| Carnauba wax | 30.0 |
| Mineral oil | 45.0 |
| Petrolatum (Chesebrough-Ponds "Vaseline" white petroleum jelly) | 15.0 |
| Du Pont "Ti-Pure R–901" $TiO_2$ | 75.0 |

Laminating speed was approximately 1.2 inches per second and exposure speed of about 4.4 inches/second was employed. The laminate was formed from two coated samples and had a total thickness of 3.2 mils. A stencil was prepared and carbon transfer copies were made as in Example I Several excellent black on white copies were obtained. This material had a wider exposure latitude and better durability then previous laminates.

In the following examples, unless stated otherwise, the material for coating was dispersed by high speed, high-rate-of-shear stirring at 200–210° F., which was also the approximate coating temperature range. The coatings were applied to 1 mil Mylar traveling at about 20 ft./min. web speed using a #6 wire-wound rod as described in Example I. Laminates were prepared and exposed as in Example I to produce several copies, one at a time and in the exposure configuration described in Example I.

Images were dense black on white and were obtained with Columbia Marathon 5-40 typewriter carbon paper. The stencils were prepared in the IBM electric typewriter as described in Example I.

EXAMPLE V

This example illustrates the use of a waxy material other than Carnauba wax. The following formulation was employed:

| | |
|---|---|
| Castorwax (Baker Castor Oil Co., lot #2790) _____grams__ | 50.0 |
| Mineral oil _____do____ | 60.0 |
| Du Pont "Ti-Pure R-901" TiO$_2$ _____do____ | 50.0 |
| Laminating speed _____inches/sec__ | 1.2 |
| Laminate total thickness _____mils__ | 3.0 |
| Exposure speed _____inches/sec__ | 5.3 |

EXAMPLE VI

This example illustrates the use of an oily material other than mineral oil. The following formulation was employed:

| | |
|---|---|
| Carnauba wax _____grams__ | 30.0 |
| PX-917 tri-cresyl phosphate (Pittsburgh Chemical Co.) _____grams__ | 45.0 |
| Du Pont "Ti-Pure R-901" TiO$_2$ _____do____ | 60.0 |
| Laminating speed _____inches/sec__ | 1.2 |
| Laminate total thickness _____mils__ | 4.0 |
| Exposure speed _____inches/sec__ | 3.3 |

EXAMPLE VII

This example illustrates the use of a pigment other than titanium dioxide. The following formulation was employed:

| | |
|---|---|
| Carnauba wax _____grams__ | 40.0 |
| Mineral oil _____do____ | 40.0 |
| "Thermoguard H" antimony oxide (Metal and Thermit Corp., lot No. 14-61) _____grams__ | 80.0 |
| Laminating speed _____inches/sec__ | 1.1 |
| Laminate total thickness _____mils__ | 3.7 |
| Exposure speed _____inches/sec__ | 5.2 |

EXAMPLE VIII

The purpose of this example is to illustrate the use of completely different waxy material, oil, and pigment than those shown in Example III to prepare a similar pressure-spreadable laminate stencil material. The formulation consisted of:

| | |
|---|---|
| Castorwax _____grams__ | 40.0 |
| Tri cresyl phosphate _____do____ | 40.0 |
| "Thermoguard H" Antimony Oxide _____do____ | 60.0 |
| Laminating speed _____inches/sec__ | 1.2 |
| Laminate total thickness _____mils__ | 3.0 |
| Exposure speed _____inches/sec__ | 5.7 |

EXAMPLE IX

This example illustrates the replacement of a wax by a waxy material, stearic acid, which consists of a long chain hydrocarbon having a carboxylic acid group on it. The formulation contained:

| | |
|---|---|
| Stearic acid N.F. (Fisher Scientific Company) _____grams__ | 30.0 |
| Mineral oil _____do____ | 45.0 |
| Du Pont "Ti-Pure R-901" TiO$_2$ _____do____ | 60.0 |
| Laminating speed _____inches/sec__ | 2.8 |
| Laminate total thickness _____mils__ | 2.9 |
| Exposure speed _____inches/sec__ | 4.4 |

The stearic acid formulation had a whiter appearance than those employing Carnauba wax probably due to better oxidation resistance of the acid at the temperature of dispersion and coating.

EXAMPLE X

This example illustrates the use of a waxy amide as an ingredient in a pressure-spreadable laminate. The following formulation was coated at about 100° C.:

| | |
|---|---|
| Behenamide ("Kenstrene Amide-B," lot No. 5598, Humko Products) _____grams__ | 30.0 |
| Mineral oil _____do____ | 45.0 |
| Du Pont "Ti-Pure R-901" TiO$_2$ _____do____ | 67.0 |
| Laminating speed _____inches/sec__ | 1.2 |
| Laminate total thickness _____mils__ | 4.3 |
| Exposure speed _____inches/sec__ | 2.8 |

EXAMPLE XI

This example illustrates the use of a fattay ester as the waxy material. The following formulation was coated at about 78° C.:

| | |
|---|---|
| Glyceryl monostearate (Fisher Scientific Co.) _____grams__ | 30.0 |
| Mineral oil _____do____ | 45.0 |
| Du Pont "Ti-Pure R-901" TiO$_2$ _____do____ | 75.0 |
| Laminating speed _____inches/sec__ | 2.5 |
| Laminate total thickness _____mils__ | 3.0 |
| Exposure speed _____inches/sec__ | 4.4 |

EXAMPLE XII

This example illustrates the use of a surface active agent to improve the dispersion of the pigment in the pressure-spreadable formulation containing:

| | |
|---|---|
| Carnauba wax _____grams__ | 30.0 |
| Mineral oil _____do____ | 30.0 |
| Petrolatum _____do____ | 15.0 |
| "Unitane O-110" TiO$_2$ (American Cyanamid Co.) _____grams__ | 6.0 |
| "Igepal CA-630" Alkyl phenoxy polyoxyethylene ethanol surface active agent (General Aniline & Film Corp.) _____grams__ | 6.0 |
| Laminating speed _____inches/sec__ | 1.2 |
| Laminate total thickness _____mils__ | 3.0 |
| Exposure speed _____inches/sec__ | 3.3 |

EXAMPLE XIII

This example illustrates the addition of a thixotropic agent to a pressure-spreadable formulation. The agent imparts thixotropic behavior to the oily phase. The formulation contained:

| | |
|---|---|
| Carnauba wax _____grams__ | 30.0 |
| Mineral oil _____do____ | 30.0 |
| Petrolatum _____do____ | 15.0 |
| "Unitane O-110" TiO$_2$ (American Cyanamid Co.) _____grams__ | 75.0 |
| Igepal CA-630 (General Aniline & Film Corp.) _____grams__ | 6.0 |
| Thixatrol ST (Baker Castor Oil Co., lot #1030) _____grams__ | 3.0 |
| Laminating speed _____inches/sec__ | 1.2 |
| Laminate total thickness _____mils__ | 3.3 |
| Exposure speed _____inches/sec__ | 4.0 |

EXAMPLE XIV

This example illustrates the incorporation of non-thermographic coloring matter in a pressure-spreadable formulation.

The formulation used consisted of that employed in Example IV above plus 0.75 g. Du Pont Oil Blue A, lot #63 SH blue dye added to the hot mixture with rapid stirring.

Laminating speed, total laminate thickness and exposure speed were essentially the same as in Example IV.

The laminate prepared from the formulation had a pleasant blue color which did not adversely affect its spreading properties or infrared transmission and reflection.

In the foregoing examples the laminate stencil was used to produce images thermographically by carbon paper transfer. However, any suitable thermographic transfer material may be used, such as thermographic toner powders, and the like. The stencil also worked well in producing images directly on thermally sensitive papers.

The stencil may be further used for projection of images by visible light.

Although I have disclosed certain specific embodiments and preferred modes of practice of my invention, it will be understood that this is solely for purposes of illustration and that the invention is not limited thereto. It will be obvious that the stencil laminate could be used with heat-sensitive image papers instead of carbon transfer and that other radiation copying processes could be used in place of infrared.

Thus various changes and modifications can be made in the invention without departing from the spirit of the disclosure or the scope of the appended claims.

What is claimed is:

1. A method for reproducing an image by means of infrared radiation which comprises:

forming a stencil laminate material having a layer of a pressure spreadable metallic oxide material which is substantially reflective to infrared radiation between 7,000 and 30,000 angstroms between sheets of material transparent to said infrared radiation with at least one of said sheets being pressure transmitting, applying pressure on said stencil laminate material in desired image areas to render said areas transparent to said infrared radiation to form a stencil, placing said stencil in juxtaposition with a thermal sensitive paper for producing said image under the influence of said infrared radiation, and passing infrared radiation through the image areas of said stencil.

2. A method for reproducing an image by means of infrared radiation which comprises:

forming a stencil laminate material having a layer of a pressure spreadable metallic oxide material which is substantially reflective to infrared radiation between 7,000 and 30,000 angstroms between sheets of material transparent to said infrared radiation with at least one of said sheets being pressure transmitting, applying pressure on said stencil laminate material in desired image areas to render said areas transparent to said infrared radiation to form a stencil, placing said stencil in contact with a transfer sheet having a fusible thermographic layer, placing a receptor paper in contact with said fusible thermographic layer of said transfer sheet, and passing infrared radiation through the image areas of said stencil.

3. A method for reproducing an image by means of infrared radiation which comprises:

forming a stencil laminate material having a layer of a pressure spreadable metallic oxide material which is substantially reflective to infrared radiation between 7,000 and 30,000 angstroms between sheets of material transparent to said infrared radiation with at least one of said sheets being pressure transmitting, applying pressure on said stencil laminate material in desired image areas to render said areas transparent to said infrared radiation to form a stencil, placing said stencil in contact with a transfer sheet having a fusible thermographic layer, placing a receptor paper in contact with said fusible thermographic layer of said transfer sheet, passing infrared radiation through the image areas of said stencil, separating said receptor paper from said transfer sheet with the visible thermographic image on said receptor paper, and submitting said image to an additional exposure of infrared radiation.

References Cited

UNITED STATES PATENTS

| 2,120,064 | 6/1938 | Buckley | 250—67 |
| 2,462,018 | 2/1949 | Wood | 250—67 X |
| 3,038,994 | 6/1962 | Nelson et al. | 250—65 |

FOREIGN PATENTS

| 722,023 | 1/1955 | Great Britain. |

WILLIAM F. LINDQUIST, *Primary Examiner.*

U.S. Cl. X.R.

250—67